(12) United States Patent
Handa

(10) Patent No.: US 7,681,604 B2
(45) Date of Patent: Mar. 23, 2010

(54) GAS COOLING METHOD USING A MELTING/SOLIDIFYING MEDIA FOR HIGH PRESSURE STORAGE TANKS FOR COMPRESSED NATURAL GAS OR HYDROGEN

(76) Inventor: Kiyoshi Handa, Honda R&D Americas, Inc., 21001 State Route 739, Raymond, OH (US) 43067-9705

( * ) Notice: Subject to any disclaimer, the term of this patent is extended or adjusted under 35 U.S.C. 154(b) by 924 days.

(21) Appl. No.: 11/381,005

(22) Filed: May 1, 2006

(65) Prior Publication Data

US 2007/0000563 A1    Jan. 4, 2007

Related U.S. Application Data

(60) Provisional application No. 60/679,102, filed on May 9, 2005.

(51) Int. Cl.
*B65B 1/04*    (2006.01)

(52) U.S. Cl. ............................................. 141/82
(58) Field of Classification Search ................ 141/82, 141/2, 18, 98, 286, 67; 62/50.1–50.5; 123/525; 137/255, 263; 272/146.1, 146.6
See application file for complete search history.

(56) References Cited

U.S. PATENT DOCUMENTS

| | | | | |
|---|---|---|---|---|
| 7,377,294 B2* | 5/2008 | Handa | ........................... | 141/82 |
| 7,559,689 B2* | 7/2009 | Harty | ........................... | 374/165 |
| 7,637,292 B2* | 12/2009 | Handa | ........................... | 141/82 |

* cited by examiner

*Primary Examiner*—Steven O Douglas
(74) *Attorney, Agent, or Firm*—Porter, Wright, Morris & Arthur, LLP

(57) ABSTRACT

A system for increasing the overall efficiency of a high pressure gas fueled vehicle and refilling station infrastructure wherein the compression heat of high pressure refueling of an on board tank is absorbed by a temperature dependent melting/solidifying media within the interior of an on board tank and may be dispersed through an external radiator.

13 Claims, 7 Drawing Sheets

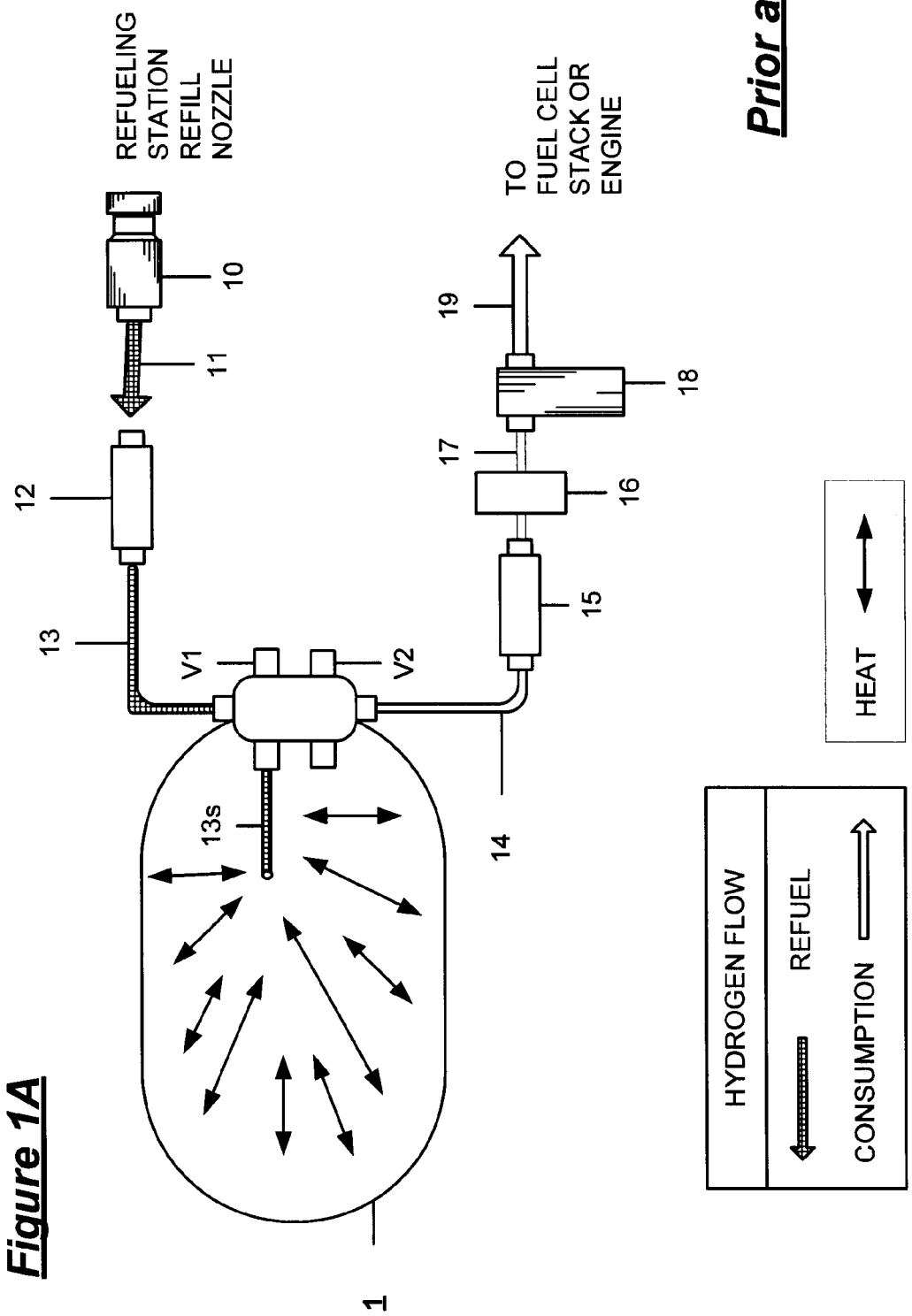

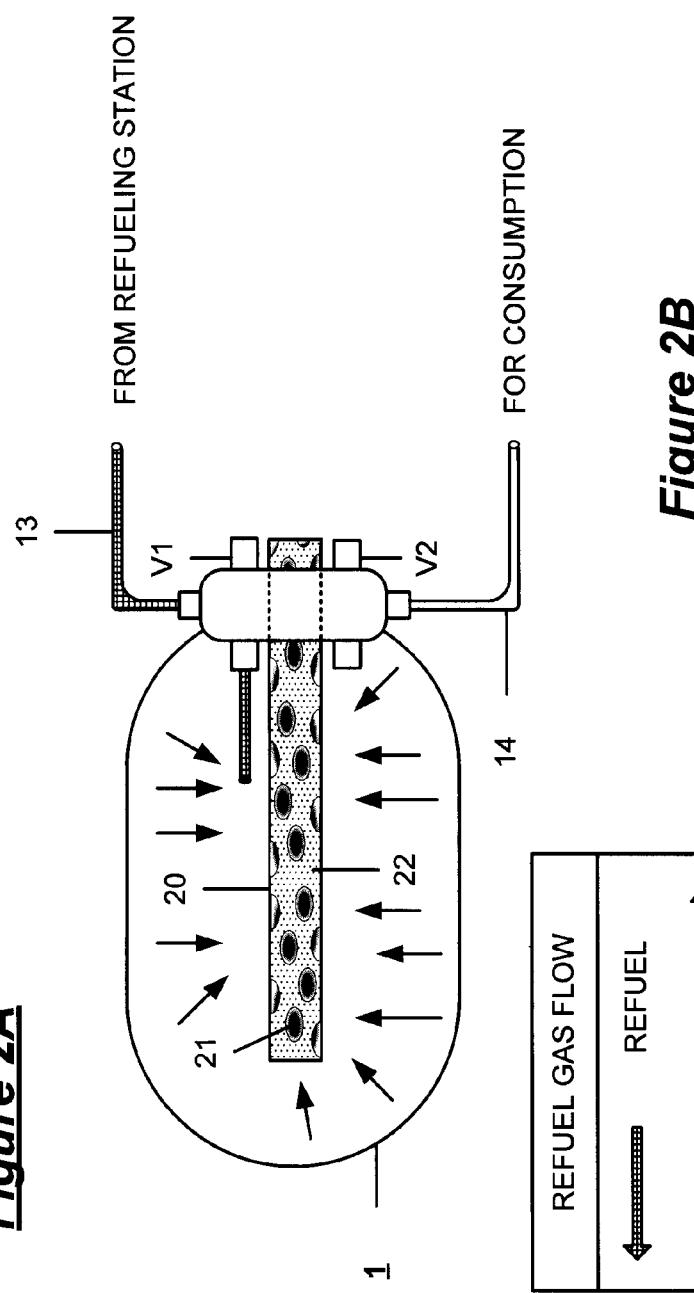
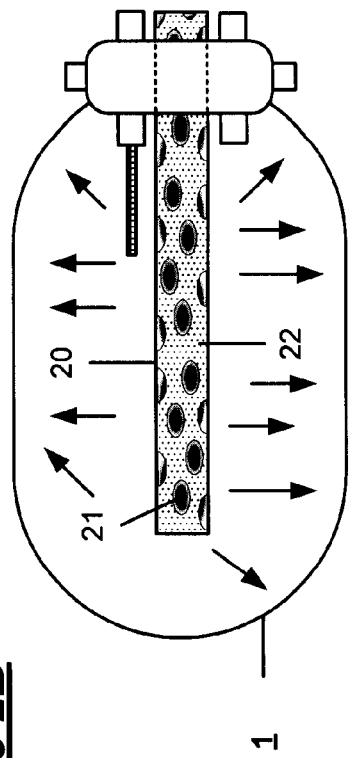
*Figure 2A*
*Figure 2B*

GAS COOLING METHOD USING A MELTING/SOLIDIFYING MEDIA FOR HIGH PRESSURE STORAGE TANKS FOR COMPRESSED NATURAL GAS OR HYDROGEN

RELATED APPLICATIONS

This application is related to and claims all benefits under 35 U.S.C. §119(e) of my earlier U.S. Provisional Patent Application Ser. No. 60/679,102 filed on May 9, 2005, entitled "Gas Cooling Method Using a Melting/Solidifying Media for High Pressure Storage Tanks for Compressed Natural Gas or Hydrogen."

FIELD OF THE INVENTION

The present invention relates to a gas cooling method using a melting/solidifying media for high pressure storage tanks for compressed natural gas or hydrogen. Particularly, the invention provides an on board system and apparatus for efficiently refueling the on board vehicle gas tanks with hydrogen and/or compressed natural gas (CNG) when the vehicle is refueled at high pressure from high pressure storage tanks used at refueling stations or depots.

BACKGROUND OF THE INVENTION

When hydrogen is used as a fuel in motor vehicles, a hydrogen fuel depot infrastructure for refueling must also be developed. Typically, in the use of hydrogen to power fuel cells or in the use of CNG to power internal combustion engines in motor vehicles, present practice is that high pressure fuel gas is stored in on board fuel tanks maintained at a maximum design pressure in the range of about 3600 psi for CNG to about 5000 psi for hydrogen. Achieving a full refill of gas in the tank to design specification and an increase in the energy efficiency of the overall system of refuel depots and on board vehicle tanks and their interrelationship are desirable goals.

Hydrogen powered vehicles utilize light weight polymer/composite hydrogen storage tanks to store hydrogen fuel on board at high pressure. Herein, reference to hydrogen powered vehicles correlates with the use of the invention with compressed natural gas powered vehicles (CNGVs). For clarity, hydrogen is referred to in the specification and is a term intended to be interchangeable, generally evident in context, with compressed natural gas, high pressure gas, or gas. The use of multiple cylindrically shaped small tanks rather than a single large tank is preferred for vehicle design purposes. Various designs for high pressure hydrogen refueling systems have been proposed. When the storage tank of a hydrogen powered vehicle is filled with hydrogen, the pressurized on board storage tanks for the gas may be characterized as including chemical energy from the gas itself (consumed in powering the vehicle), and mechanical and thermal energy associated with the high pressure under which the gas is stored at the refuel depot and refueled into the vehicle tank[s].

During a high pressure refueling process with hydrogen or CNG, the interior of the on board tanks, namely, the gas itself, becomes heated as a result of gas compression as the tank pressure increases and other refueling parameters affect the process. After refueling, the tank interior gas temperature and pressure decrease slowly as the fuel gas is consumed during vehicle operation. Conventionally, it is not usually possible to obtain a full refill tank pressure to a high pressure design maximum without some form of secondary gas processing. In one example of pressure compensation during the course of refueling, the charge of fuel input into and stored in the tank must be initially in excess of the optimum design tank pressure because of the compression/heating effect: as temperature increases, less fuel per unit of tank volume can be accepted by the tank. In another example of secondary treatment, the refuel gas is precooled before input into the tank. Without a full charge of fuel, vehicle mileage in terms of vehicle range is reduced; the use of higher design pressures worsens this condition. A third variation of an attempt to resolve the less than full fill problem involves a slow flow rate during refill resulting in a lower initial tank temperature, however, a slow fill, is undesirable, and may be impractical. An undesirable consequence of a slower flow rate during refueling to avoid heat build up is a longer refueling time. Solutions proposed to precool the gas before refueling and to initially overfill require substantial energy, thereby reducing the overall energy efficiency of a hydrogen economy. The build up of the compression heat of refueling is generally not a concern when fill pressures are at about 3600 psi and 5000 psi or lower, however, as refill and tank pressures exceed 3600 psi and 5000 psi and approach or exceed 5000 psi and 10,000 psi, temperature compensation, cooling, becomes an important factor in the refueling process to achieve a full fill. With a full fill, overall vehicle range per each tank refill is extended and overall customer satisfaction is increased.

OBJECTS OF THE INVENTION

It is an object of the present invention to enhance refueling efficiency, to minimize energy expense and to improve high pressure gas refilling systems such that, when factored into the overall infrastructure of hydrogen powered vehicles and fuel depots, added energy efficiency results. Typically, each time a vehicle is refueled with hydrogen, compression energy results in tank heating, hence, it is an object of the invention to provide an on board vehicle system and apparatus to minimize tank heating at the refueling depot and to increase the efficiency and refueling capacity of an on board high pressure fuel storage tank in a gas powered motor vehicle.

SUMMARY OF THE INVENTION

The invention provides a system that can remove the compression heat resulting from refueling an on board tank during refueling. A significantly faster refueling time, increased refueling efficiency and overall vehicle range will increase as a result of improved tank capacity per unit volume, particularly where nominal refill pressure is above 3600 psi and 5000 psi and reaches the range of 10,000 psi or greater. In accordance with the present invention, effective solutions to fuel tank heating during the refueling process include a system for heat evacuation in which a tank interior heat absorber comprising a melting/solidifying media is interconnected with an external heat radiator. The melting/solidifying media collects interior tank heat during a fast high pressure refueling. The melting/solidifying media by itself may absorb sufficient heat during the refuel process, or the absorbed heat may be radiated through a heat pipe connection into the ambient atmosphere or other vehicle system appropriate for the dispersion or use of absorbed heat of refueling compression. In an example of the invention, a central tube containing a cooling media within the tank interior absorbs heat by mass heat absorption utilizing a melting/solidifying media, such as naphthalene, contained within the tube. During refueling, the melting/solidifying media absorbs heat while melting; the media returns to a solid state as the liquid composition cools after refueling and continued vehicle operation consumes the fuel in the tank and thereby reduces temperature and pressure in the tank. In an alternative embodiment, a central heat pipe internally concentric within the melting/solidifying media tube within the tank conducts the heat absorbed by the media to the tank exterior where the captured heat is dispersed by a radiator or otherwise.

The invention is described more fully in the following description of the preferred embodiment considered in view of the drawings in which:

BRIEF DESCRIPTION OF THE SEVERAL VIEWS OF THE DRAWINGS

FIG. 2A shows an interior cooling tube filled with melting/solidifying media utilized to absorb the refueling heat of compression by heat mass absorption. As the gas in the tank and the media in the tube cool after refueling, the media returns to a solid state. FIG. 2B shows heat radiating from the media into the gas in a media cooling/gas heating stage.

DETAILED DESCRIPTION OF THE INVENTION

In brief, a system is provided for a gas powered vehicle having an on board tank for the storage of a fuel gas under high pressure. The tank refill capacity is enhanced and the time required to refill one or more than one on board fuel tank is reduced. A melting/solidifying heat absorbent media within the tank absorbs heat of compression resulting from the refueling process, and the absorbed heat may be conducted to a radiator external to the tank to exhaust the absorbed heat from the tank to an external environment.

The system of the invention increases the refueling energy efficiency of high pressure gas powered vehicles by withdrawing the heat of refilling compression from the on board tanks and by eliminating the need for a pressure overfill and/or refueling station pre-cooling of the gas before a tank refill. Less compression energy is required to refill the tanks; the invention increases the total energy efficiency of CNG or hydrogen station high pressure gas utilization by reducing the energy required to refill the on board tanks with high pressure gas at the station to the vehicle directly with sufficient gas such that a full (design pressure) refill is achieved in the process of refueling.

Figure 1B:
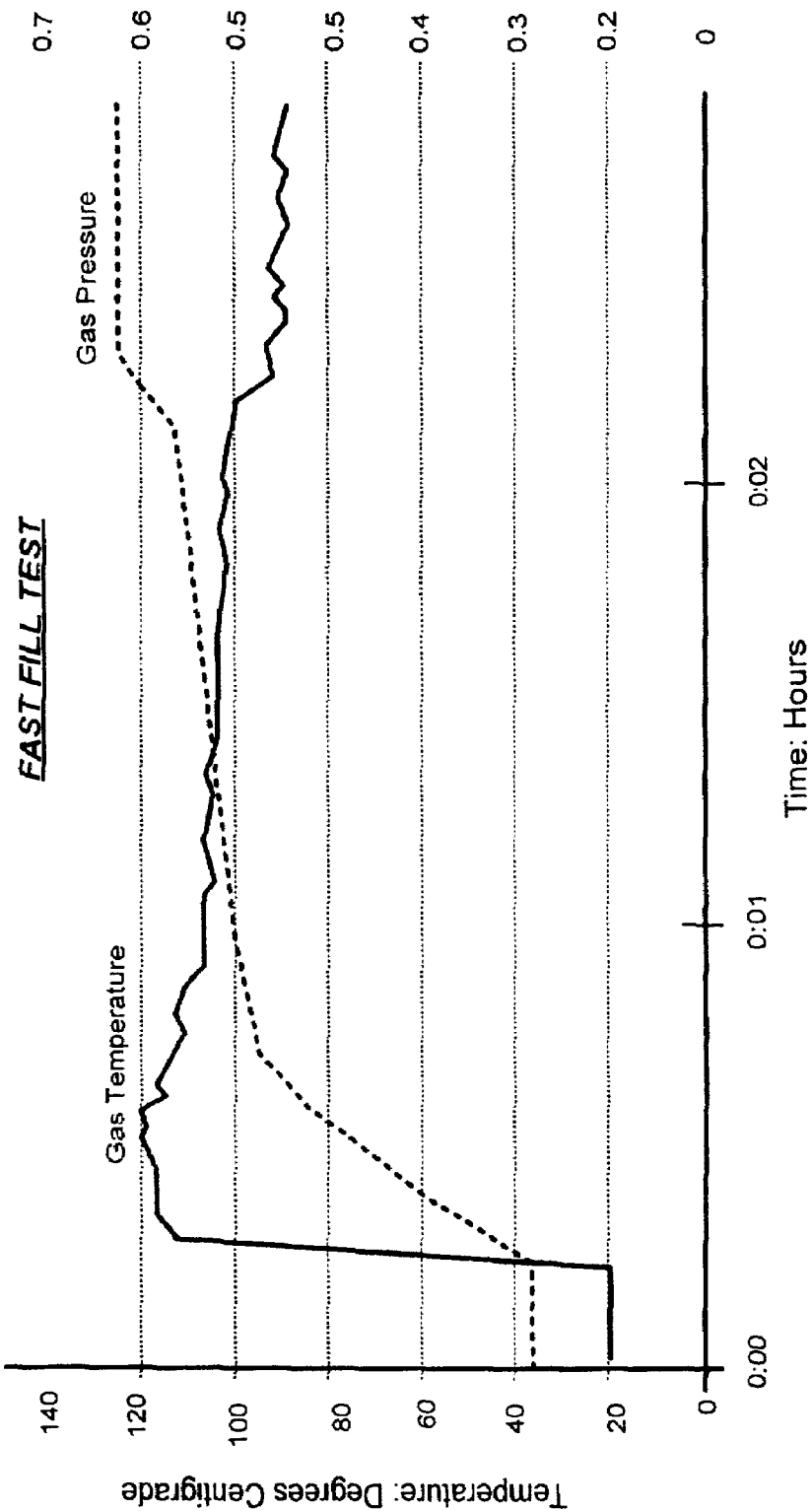
FIG. 1A is a schematic diagram showing heat radiation and build up in a vehicle fuel tank during refueling in a typical prior art high pressure hydrogen or CNG refueling system. A chart of gas temperature T C° and gas pressure P, plotted against time, derived from a fast fill high pressure test is shown in FIG. 1B.

FIG. 1A illustrates an example of a prior art high pressure tank system for hydrogen or CNG vehicles. A first on board tank 1 includes an inlet valve V1 with a fuel line check valve 12 in series with refuel line leading to the tank 13 through inlet stem 13s. The refill line is connectable to station refill nozzle 10 allowing the flow of hydrogen 11 into the tank. Fuel consumption line from the tank 14 extends from V2 through valve 16 and pressure regulators 16 and 18 to the fuel cell stack or engine through lines 17 and 19. For clarity in subsequent drawing figures, elements 10, 11, 12 and 13s on the refill side and elements 15, 16, 17, 18, and 19 on the consumption side may not be shown. Illustrating the compression heating refill phenomenon with which the invention deals, FIG. 1B depicts a chart of gas temperature T C° and gas pressure P, plotted over time, derived from a fast fill high pressure test.

Typically, on board vehicle tanks are cylindrical with hemispherical ends and are by design capable of storing a charge of high pressure gas at an approximately 3600 psi or 5000 psi, and up to 10,000 psi or more maximum rated capacity at a defined temperature. A typical full charge by weight of hydrogen for a fuel cell powered vehicle is approximately 15 pounds. During refueling, gas in the tank interior is compressed, creating heat figuratively shown in the drawing figures by the arrows →, →, →, etc. Temperature increases with higher pressure, but as a practical matter, the maximum allowable design temperature and/or pressure maximum in an on board tank may preclude a full refill if the on board tank design temperature or pressure is exceeded. In contrast, the on board system of the invention evacuates the heat of refueling compression by providing the coolant system and apparatus for dispersing the heat as described below.

FIG. 2A illustrates an example of an on board vehicle high pressure storage tank system. The tank is formed of a carbon fiber; in the invention, the tank includes therein a tube formed from aluminum or copper or alloy of either 20 filled with a melting/solidifying media which captures the compression heat of refueling →. In FIG. 2A the heat absorbent media tube in the tank 20 contains a temperature dependent melting/solidifying material capable of having different physical states, such as solid and liquid, that are dependent on temperature. With a melting point of 80° C., naphthalene is an example of such a material. Before refueling, the naphthalene would be in a solid state 21 at essentially an ambient temperature of about 20° C. During the course of refueling, the naphthalene melts to a liquid figuratively shown as 22, absorbing the heat of refueling compression at the rate of approximately 147 kJ/kb (147,000 joules per kilogram of naphthalene melted). After refueling and during consumption of fuel by the vehicle, tank temperature and pressure will decrease, the liquid naphthalene will cool and radiate heat and revert to a solid state. Thus, by absorption and melting of the tube media, the refueling heat in the tank will be removed.

In a variation of the heat absorbing and dispersing refill function, the invention partly resolves the problem that during vehicle operation, the internal gas temperature in the tank cools as gas is utilized and tank pressure drops. As shown in FIG. 2B, with a temperature dependent melting/solidifying media, the heat absorbed from the compression energy of the gas refill radiates from the cooling tube in reverse fashion into the tank to heat up the gas inside of the tank, thereby increasing tank gas pressure, resulting in further operational efficiency of the fuel cell or engine powered by the fuel gas.

Figure 3A:
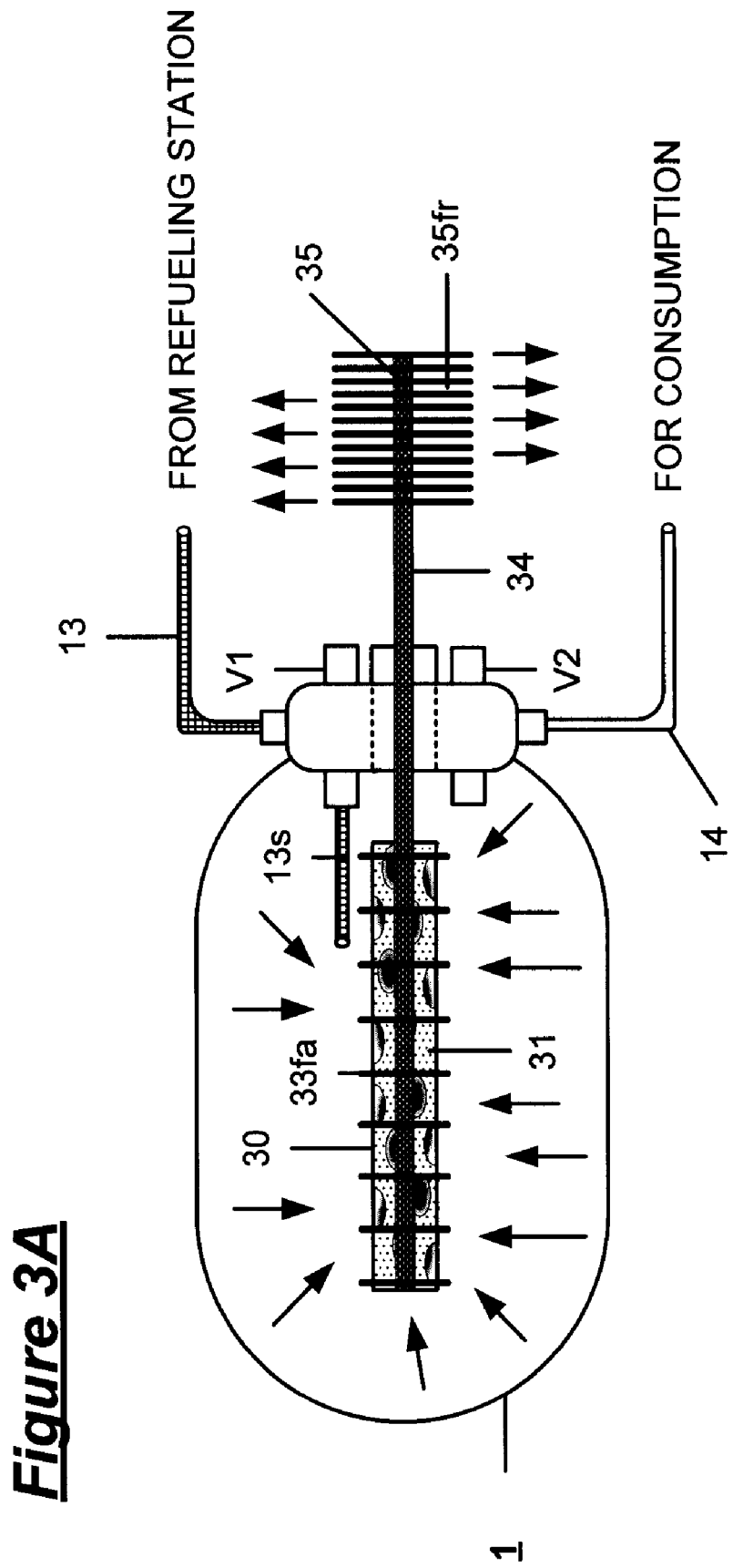
FIG. 3A shows a central heat absorbing media tube centrally disposed within the on board tank and operatively connected to an external radiator through an interiorly concentric conductive heat pipe extending from within the tube to an external radiator outside of the tank.

In another example shown in FIG. 3A, a motor vehicle high pressure storage tank system of the invention includes a heat absorbent tube, similar to that in the example described with reference to FIG. 2A and FIG. 2B. In FIG. 3A, however, the central naphthalene containing tube 30 in the tank is shown to include a plurality of heat absorbent fins 33fa within the tank interior. The assembly, as shown, also includes a centrally concentric heat pipe 34 which absorbs the heat collected by the fins 33fa and the melting naphthalene 31 and transmits the heat to a heat sink external to the tank, such as a finned or mesh radiator 35fr, a water chamber, the vehicle frame or body, or any other like mechanism capable of releasing and/or dispersing the absorbed heat.

Figure 3B:
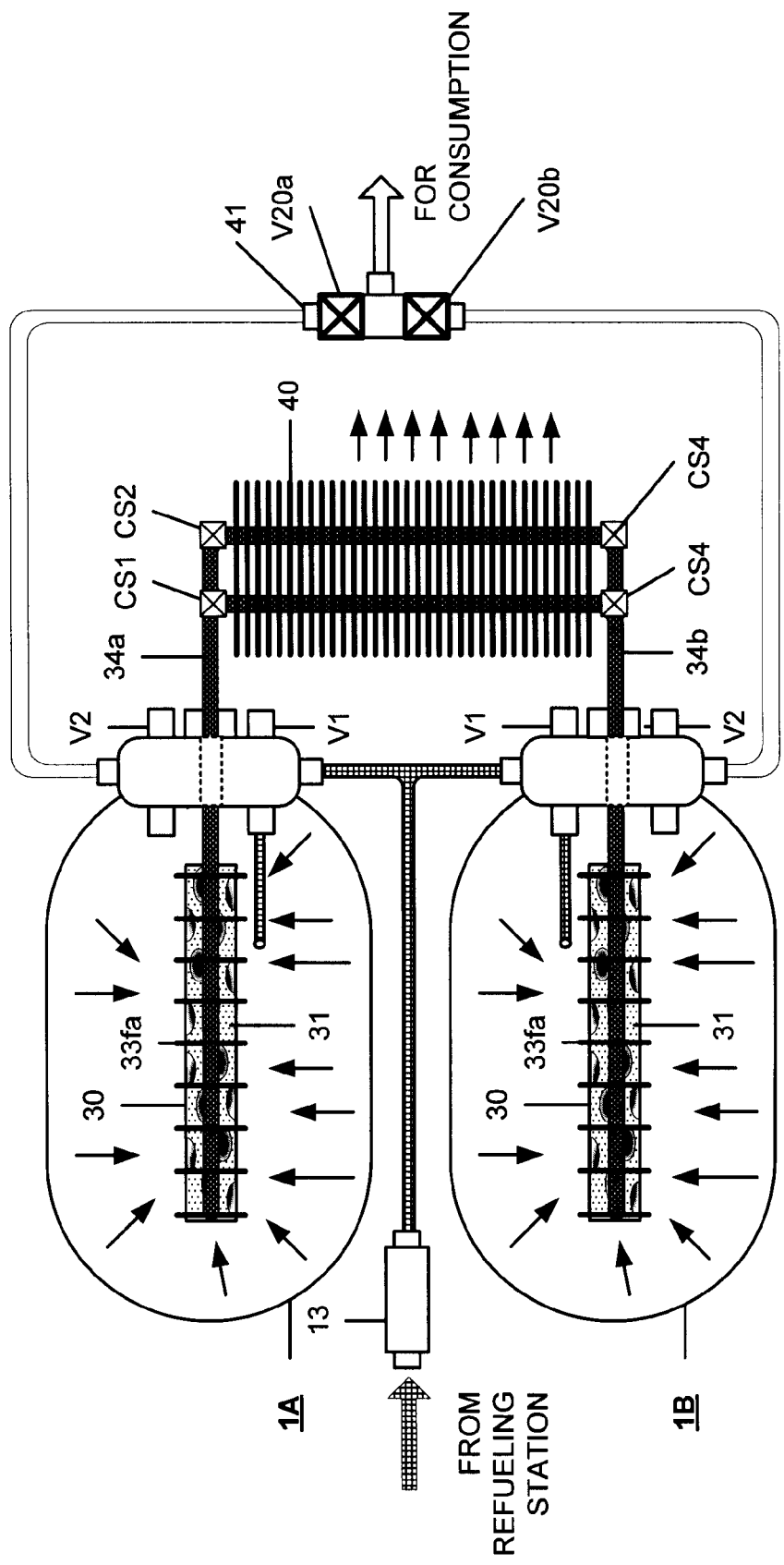
FIG. 3B and FIG. 3C show examples of multiple tanks wherein the heat pipe leading from each tank is connected to a common external radiator.
Figure 3C:
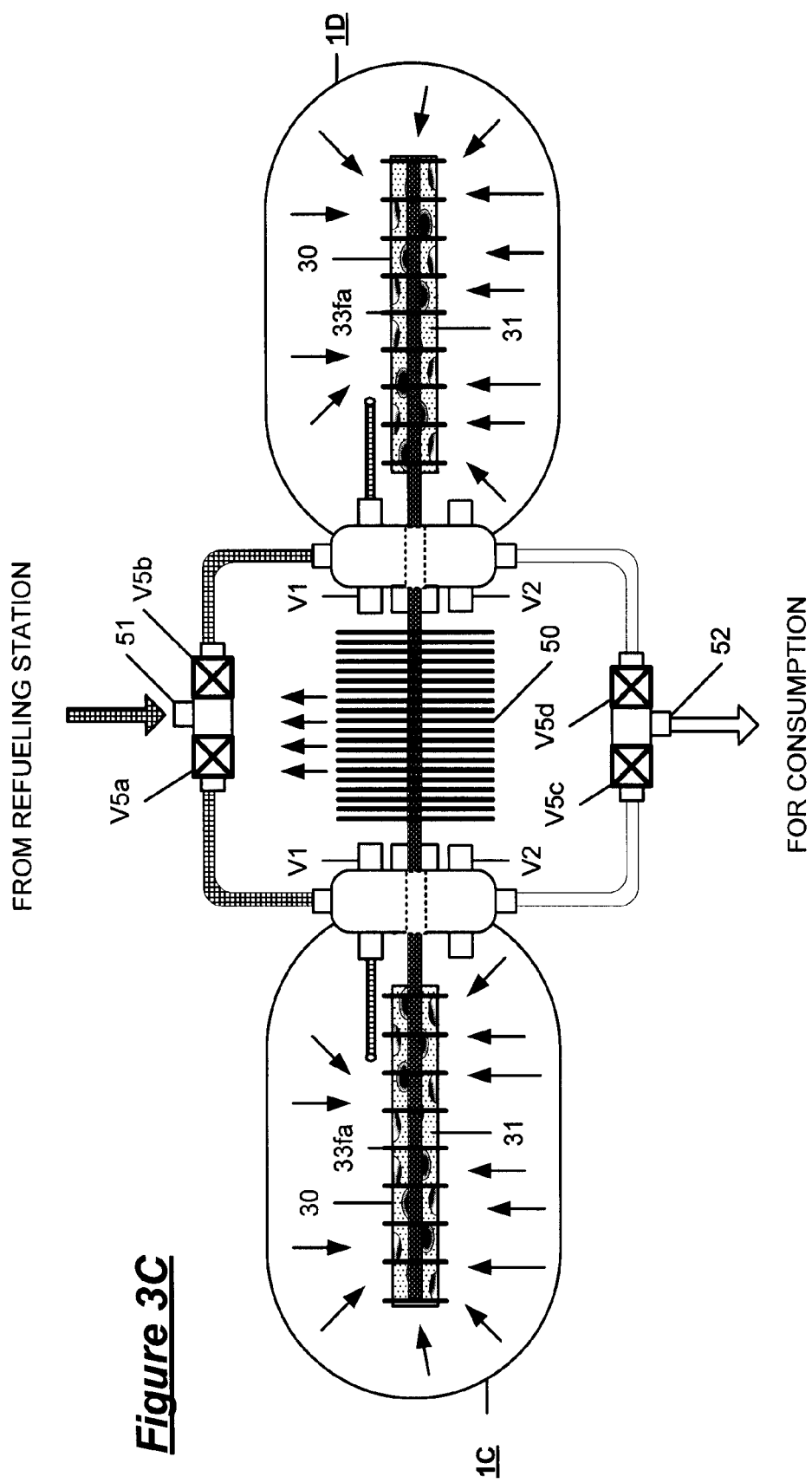

FIG. 3B and FIG. 3C show switchable arrangements of multiple tanks connected to a common radiator 40. In FIG. 3B, tank inlet valves V1 on each tank may be switchable by the vehicle control system to control whether refill gas flows simultaneously to both tanks in a parallel refill or in a serial refill. The heat pipes 34a and 34b of each tank are switchable to either a parallel refill mode or series refill mode by conduction control switches CS1, CS2, CS3, and CS4. Operation of tank inlet valves V1 is correlated with whether the refill is parallel or serial. Manifold 41 includes valves V20a and V20b associated with each tank, similarly switchable during gas consumption during vehicle operation to control whether the tanks are evacuated in series or in parallel. FIG. 3C shows an example of a multiple tank configuration in which tanks are oppositely disposed; manifolds at the inlet 51 and outlet 52 of each tank include switchable valves V5a, V5b, V5c, and V5d likewise controlling whether the tanks are refilled with gas simultaneously or in parallel and whether gas is consumed during vehicle operation with the tanks in a parallel or series configuration.

As noted, the system is adaptable to multiple tanks; a vehicle control system operates the selectable or controllable inlet valves, the selectable or controllable outlet valves and the conduction switches operatively interconnected with a control means, logic circuit, or CPU on the vehicle. The vehicle control system may include pressure and/or temperature or other sensing means associated with the tanks or their inlet and outlet lines and the coolant system for operation in accordance with predetermined or changing parameters appropriate for efficient vehicle operation. Specific control configurations and parameters, and valve locations and systems in accordance with the principles of the invention are preferably based on overall vehicle design considerations. For example, pressure, temperature, pressure change, temperature change, and other sensors may be provided to monitor tank and/or line pressures and temperatures, to start, stop and adjust heat flow and other parameters, associated with the operating protocol of the vehicle, the vehicle tank, or the valve system for refilling and consumption of pressurized fuel in the course of vehicle operation in accordance with the principles of the invention. Although not part of the invention herein, per se, an example of a control system useful with a multiple tank assembly is included in co-pending application Ser. No. 11/001,881, "Hydrogen Vehicle Gas Utilization and Refueling System" filed on Dec. 2, 2004 in the United States Patent Office, and assigned to the same assignee as is the present application hereof.

Figure 4:
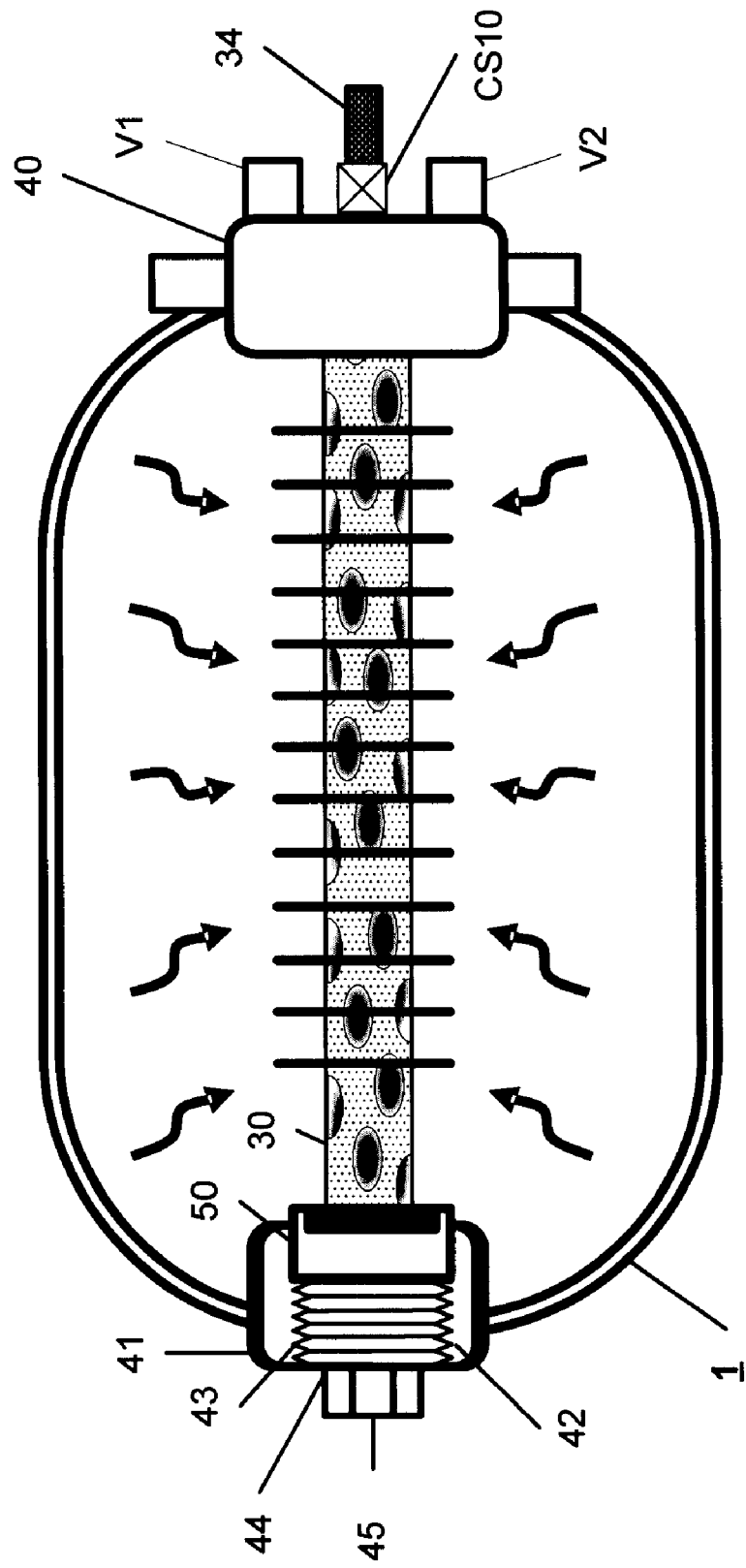
FIG. 4 shows an example of an end cap configuration for a high pressure tank used to secure the media and heat pipe coolant system within the tank.

FIG. 4 shows a configuration for a tank 1 of the invention having end cap apparatus 40 and 41 at each end of the fuel tank. Cap 41, at the end of the tank opposite the inlet/outlet end, includes outside threads 42 on a screw in plug assembly 44 having locking nut device 45. Threads 42 are cooperative with interior threads 43 in the cap to maintain the coolant tube 30 and heat pipe 34 in a fixed position within the tank by receiver 50. The cap 40 on the inlet/outlet end of the tank includes gas tank inlet valve V1 and gas outlet valve V2. Conductivity control switch CS10 is shown disposed concentric with heat pipe 34.

In the examples described herein, it is assumed that during the state of refueling, the outlet valve for each tank is closed; and during the instance of vehicle operation when gas is consumed, the inlet valve for each tank is closed.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. In a gas powered vehicle having one or more than one on board tank for the storage of a fuel gas under high pressure, a system including: a melting/solidifying heat absorbent/heat releasing media within the one or more than one tank, the media capable of having solid and liquid physical states that are dependent on temperature; a radiator external to the one or more than one tank; the media and the radiator being interconnected, such that, in the course of refueling the tank, the heat of compression occurring during refueling is exhausted to the external environment, and, in the course of vehicle operation, heat from an external environment is introduced into the tank.

2. The system of claim 1 wherein the media is naphthalene.

3. The system of claim 1 or claim 2 wherein the media and the external radiator are interconnected through a heat pipe.

4. The system of claim 1 wherein the one or more than one on board tank is arranged in a parallel relationship with respect to a refueling interconnection.

5. The system of claim 1 wherein the one or more than one on board tank is arrange in a series relationship with respect to the refueling interconnection.

6. In a gas powered vehicle having one or more than one on board tank for the storage of a fuel gas under high pressure, a system wherein a melting/solidifying heat absorbent media within the one or more than one tank absorbs heat of compression resulting from a refueling process for one or more than one tank.

7. The system of claim 1 wherein the interconnection of the media and the radiator is effected through a tube formed from a heat conductive metal or metal alloy filled with a melting/solidifying media, the tube being centrally located within the tank.

8. The system of claim 2 wherein the naphthalene: i) is in a solid state at an ambient temperature before refueling, ii) during the course of refueling, the solid naphthalene melts to a liquid absorbing the heat of refueling compression, and iii) after refueling and during consumption of fuel by the vehicle, as the tank temperature and pressure decrease, the liquid naphthalene cools, radiates heat and reverts to a solid state.

9. The system of claim 1 wherein the radiator external to the one or more than one tank is a heat sink.

10. The system of claim 9 wherein the heat sink comprises one of: i) a finned radiator, ii) a mesh radiator, iii) a water chamber, iv) a frame of the vehicle, v) a body of the vehicle, vi) a mechanism capable of releasing heat, and vii) a mechanism capable of absorbing heat.

11. The system of claim 9 wherein the heat sink comprises more than one of: i) a finned radiator, ii) a mesh radiator, iii) a water chamber, iv) a frame of the vehicle, v) a body of the vehicle, vi) a mechanism capable of releasing heat, and vii) a mechanism capable of absorbing heat.

12. The system of claim 7 wherein the central tube in the tank includes a plurality of heat conductive fins within the tank interior.

13. The system of claim 2 wherein the naphthalene: i) during vehicle operation, melts to a liquid state; and ii) during the course of melting, releases heat to the tank interior.

* * * * *